(12) United States Patent
Randez Perez et al.

(10) Patent No.: US 7,237,995 B2
(45) Date of Patent: Jul. 3, 2007

(54) DEVICE FOR ATTACHING A PANEL TO A SUPPORT

(75) Inventors: Jesus Randez Perez, Barcelona (ES); Josep Ventallo Sabater, Barcelona (ES)

(73) Assignee: ITW Espana, S.A., Barcelona (ES)

( * ) Notice: Subject to any disclaimer, the term of this patent is extended or adjusted under 35 U.S.C. 154(b) by 192 days.

(21) Appl. No.: 11/037,020

(22) Filed: Jan. 19, 2005

(65) Prior Publication Data
US 2005/0163587 A1    Jul. 28, 2005

(30) Foreign Application Priority Data
Jan. 26, 2004   (ES)   ................. 200400153

(51) Int. Cl.
*F16B 13/06*   (2006.01)
(52) U.S. Cl. ............... 411/45; 411/46; 411/41; 411/48; 24/293; 403/408.1
(58) Field of Classification Search ............. 411/41, 411/45–48; 24/453, 297; 403/408.1
See application file for complete search history.

(56) References Cited

U.S. PATENT DOCUMENTS

| | | | | |
|---|---|---|---|---|
| 4,925,351 A | * | 5/1990 | Fisher | 411/182 |
| 4,952,106 A | * | 8/1990 | Kubogochi et al. | 411/48 |
| 5,201,623 A | * | 4/1993 | Benedetti et al. | 411/48 |
| 5,322,402 A | * | 6/1994 | Inoue | 411/510 |
| 5,370,484 A | | 12/1994 | Morikawa | |
| 5,373,611 A | * | 12/1994 | Murata | 24/297 |
| 5,375,954 A | * | 12/1994 | Eguchi | 411/48 |
| 5,647,713 A | * | 7/1997 | Ge et al. | 411/509 |
| 5,651,634 A | * | 7/1997 | Kraus | 403/408.1 |
| 6,039,523 A | * | 3/2000 | Kraus | 411/48 |
| 6,089,805 A | * | 7/2000 | Salmon | 411/45 |
| 6,264,393 B1 | * | 7/2001 | Kraus | 403/282 |
| 6,336,768 B1 | * | 1/2002 | Kraus | 403/408.1 |
| 6,431,585 B1 | * | 8/2002 | Rickabus et al. | 280/728.3 |
| 6,514,024 B2 | * | 2/2003 | Akema et al. | 411/48 |
| 6,533,515 B2 | * | 3/2003 | Meyer | 411/45 |
| 6,726,417 B2 | * | 4/2004 | Kanie | 411/48 |
| 6,813,865 B2 | * | 11/2004 | Peterson | 52/506.05 |

(Continued)

FOREIGN PATENT DOCUMENTS

EP        0921323 A2     6/1999

(Continued)

OTHER PUBLICATIONS

Search Report for the corresponding Spanish Application received Feb. 1, 2006.

(Continued)

*Primary Examiner*—Katherine W Mitchell

(57) ABSTRACT

A device, for attaching a panel to a support, incorporates a body with an elongated lower sector having a lower segment, an intermediate segment and an upper segment in which incuts are made to operatively engage and locate a retention bushing. The retention bushing has an annular head and alternated elongate and short legs that are configured to engage the lower and intermediate segments respectively when the retention bushing is at a lower position on the elongated lower sector, and configured so that the elongate legs are deflected outwardly by engagement with vertical ribs on the elongate lower sector while the short legs engage the upper segment, when the bushing is a high position on the elongate lower sector.

5 Claims, 3 Drawing Sheets

U.S. PATENT DOCUMENTS

| | | | |
|---|---|---|---|
| 6,979,162 B2 * | 12/2005 | Kato | 411/371.1 |
| 2002/0001513 A1 | 1/2002 | Tanaka | |
| 2002/0026693 A1 * | 3/2002 | Akema et al. | 24/453 |
| 2004/0052609 A1 * | 3/2004 | Kraus | 411/353 |
| 2005/0163587 A1 * | 7/2005 | Randez Perez et al. | 411/45 |
| 2005/0214069 A1 * | 9/2005 | Perez et al. | 403/408.1 |

FOREIGN PATENT DOCUMENTS

| | | |
|---|---|---|
| EP | 0 964 170 | 12/1999 |
| FR | 2214348 A | 8/1974 |
| FR | 2 655 693 A | 6/1991 |
| WO | 02 29260 A1 | 4/2002 |
| WO | 0230710 A1 | 4/2002 |
| WO | 03064782 A2 | 8/2003 |

OTHER PUBLICATIONS

European Search Report mailed in corresponding Spanish Application on Nov. 29, 2006.

* cited by examiner

DEVICE FOR ATTACHING A PANEL TO A SUPPORT

RELATED APPLICATIONS

The present application is based on, and claims priority from, Spanish application No. 200400153, filed Jan. 26, 2004, the disclosure of which is hereby incorporated by reference herein in its entirety.

BACKGROUND OF THE INVENTION

1) Field of the Invention

This invention relates to an attachment device for connecting a panel to a support, which may be part of a car body. More specifically, the invention is directed to an attachment device, provided with a body that constitutes the means for connecting a support and a panel, and which is provided with a suitable geometry of its lower sector to facilitate coupling and removal of a retaining bushing that secures the attachment of the body to the support in the coupled situation, maintaining the perpendicular position of the body.

2) Description of the Related Art

Union parts are known for joining a door panel to a car body, these union parts being provided with an elongated lower, segment that is introduced in an orifice made in a sector of the car body in which it is secured by corresponding retaining means, and is provided with an upper segment where disc-shaped sectors (viz., members which are circular, near circular) define an essentially annular space in which a retainer joined to the panel locks by sliding, thereby attaching the panel to the body.

The means of retention disclosed in U.S. Pat. No. 6,336,768 to connect the union part to the vehicle body consist of flanges made in the lower segment, which in their connection position reach beyond the peripheral edge of the body orifice, their position being stabilized by an upper gasket that rests on the upper face of the car body.

Invention Patent EP 0 964 170 shows a part for joining a support and a panel having a retention element provided with upper anchoring tabs that are coupled to a sealing gasket and has a body with legs that engage incuts of the lower segment of the connection part. The attachment of the connection part to the body is established by the pressure exerted by the sealing gasket on the upper face of the body and by the increased diameter of the lower segment of the connection part under the body orifice.

Another possible solution for attaching the connection part to the body is shown in invention patent WO 02/29260 which shows a connection device that comprises a male and a female part connected to each other by pressure. The male part comprises an upper head provided with a neck for coupling to the panel, an intermediate segment and a lower toothed segment; the female part comprises an upper sealed sucker and elastic side arms that centre the lower position of the lower toothed segment. The female part is provided on its side arms with a peripheral step that together with the sucker establishes the connection position for the female part in the mouth of the orifice. In addition, the relative distance of the panel and the body will be set after assembling the female part, while it is foreseen that the male part is displaceable inside the female part and sets its position by coupling flanges of the female part and tabs of the toothed segment of the male part.

The constructive and functional complication of these devices, as well as the possible non-perpendicular position of the connection part and the body determine the need to develop other systems that are simpler and more reliable, such as the one proposed by the present invention.

SUMMARY OF THE INVENTION

The device for connecting a panel to a support object of this invention mainly stands our in that it comprises a body provided with an elongated lower sector having a number of segments formed by incuts and inclined steps with a special geometry in which a retention bushing is coupled, in a lower position corresponding to the insertion of the bushing and elongated sector through an orifice defined in the support, and an upper position that determines the flexion and lateral expansion of the bushing when it is introduced through the support to connect the bushing and the body to the support. The body is normally provided with an upper sector with disc-shaped areas in which a carriage joined to the panel locks by sliding.

The body is attached to the support at the upper position of the bushing with the aid of an upper gasket that rests on the upper face of the support.

The lower elongated sector of the body has an end conical segment that facilitates the passage of the body through the orifice made in the support; then at a higher level there is a lower segment, an intermediate segment and an upper segment in which incuts are made limited by upper and lower conical walls with opposite inclinations, and vertical ribs in the intermediate and upper segments. In the case of the lower segment the incut is limited by an upper conical wall, a cylindrical lower core and a single vertical rib.

The retaining bushing is provided with an annular head from where extend three elongated legs alternating with short legs.

In the lower position of the retention bushing where the elongated lower sector of the body and the bushing are introduced through the support, the elongated legs are placed on the lower segment of the body and the short legs are housed in the intermediate segment.

The elongated legs show a slight inclination near their lower ends, which will be integrated on the upper face of the end conical segment and therefore on the lower segment, to prevent them from hitting the edge of the support orifice when they are inserted through it.

After the retention bushing is inserted in the support orifice the bushing is raised in the body, so that the elongated legs slide on the vertical ribs of the intermediate segment, expanding outward under the lower face of the support to establish the retention, while the short legs are housed in (viz., engaged with) the upper segment.

The vertical rib of the lower segment constitutes a stop that prevents the retention bushing from turning about the body when the bushing is disposed in its lower position on the body.

BRIEF DESCRIPTION OF THE DRAWINGS

To complete the description being made and in order to aid a better understanding of the characteristics of the invention, according to a preferred example of the invention, a set of drawings is accompanied as an integral part of the description where for purposes of illustration and in a non-limiting manner the following is shown.

DESCRIPTION OF THE EXEMPLARY EMBODIMENT OF THE INVENTION

Figure 1:
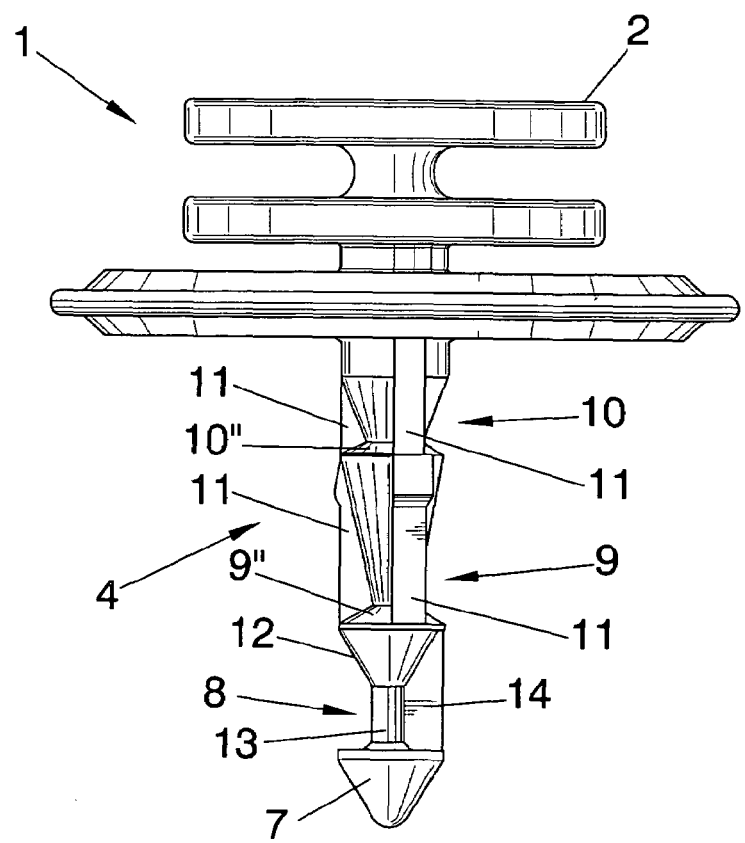
FIG. 1 is an elevation view of the body object of the attachment device.
Figure 2:
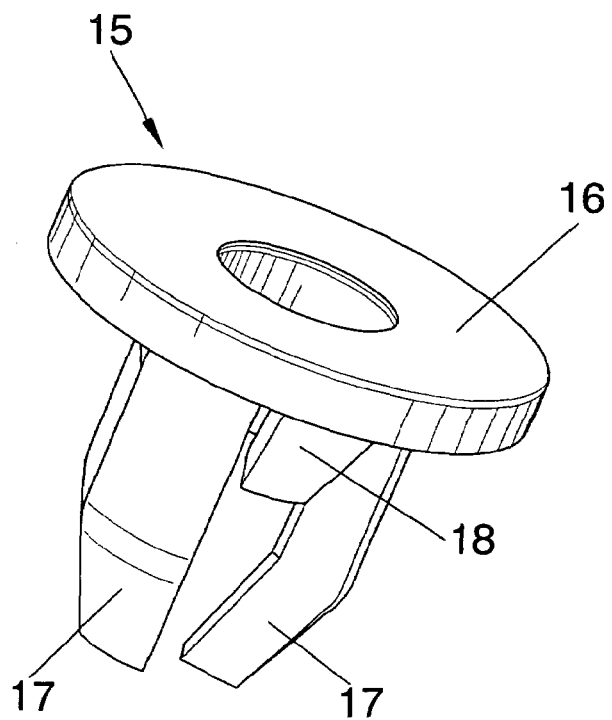
FIG. 2 is a perspective view of the retention bushing.

The device for attaching a panel to a support that is the object of this invention is based on the simple incorporation of a body (1) comprising at least an upper disc-shaped area (2) for coupling to a carriage (3) of a panel and a lower elongated sector (4) that crosses an orifice (20) of a support (5), such as a sector of a vehicle body, and may include a gasket (6) connected to the support (5) by corresponding retention means so as to rest on the upper face of the support (5) to prevent leaks.

Figure 3:
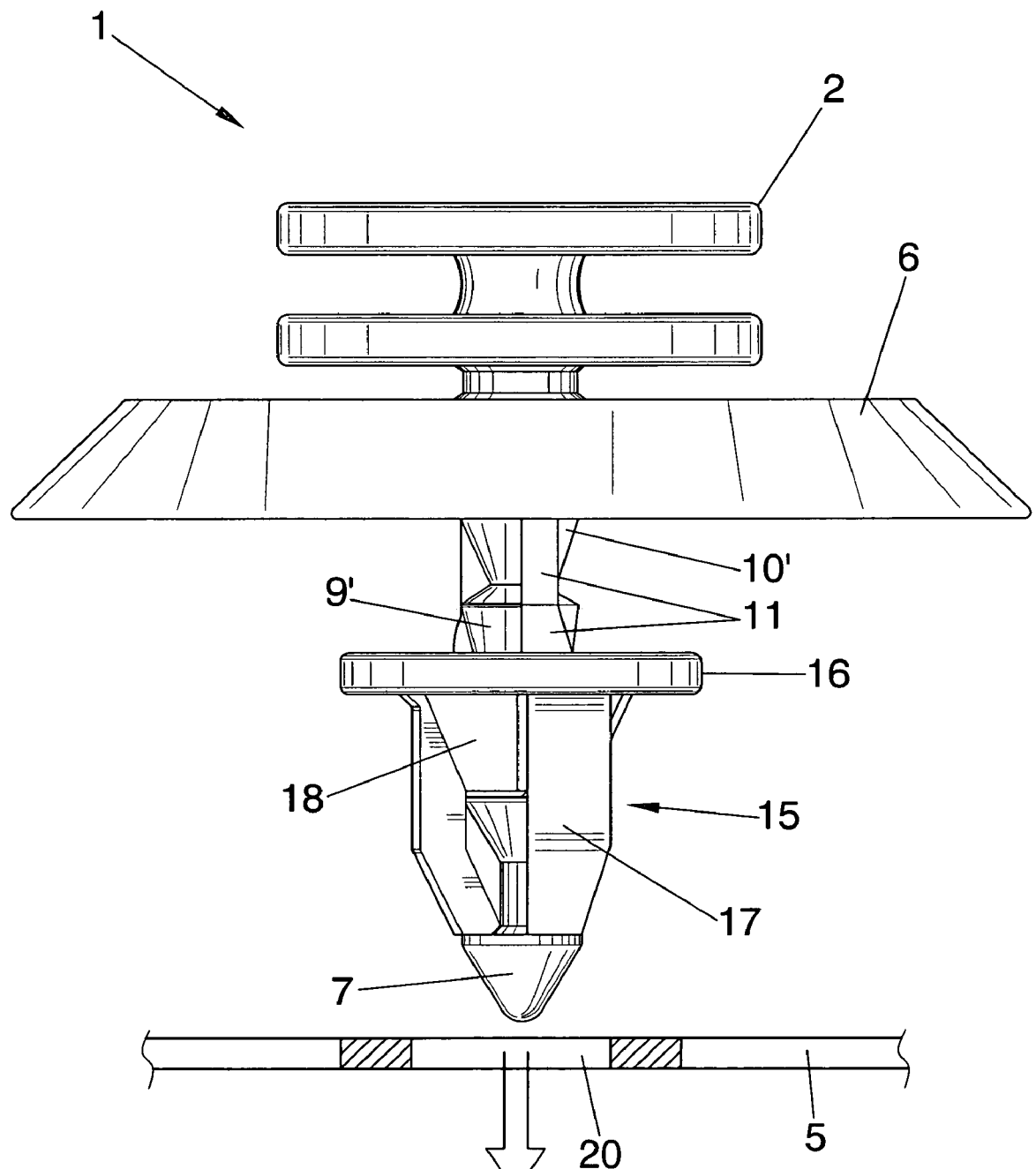
FIG. 3 is an elevation view of the attachment device in which can be seen the retention bushing in the lower position corresponding to the situation of the bushing and body inserted through the support orifice.
Figure 4:
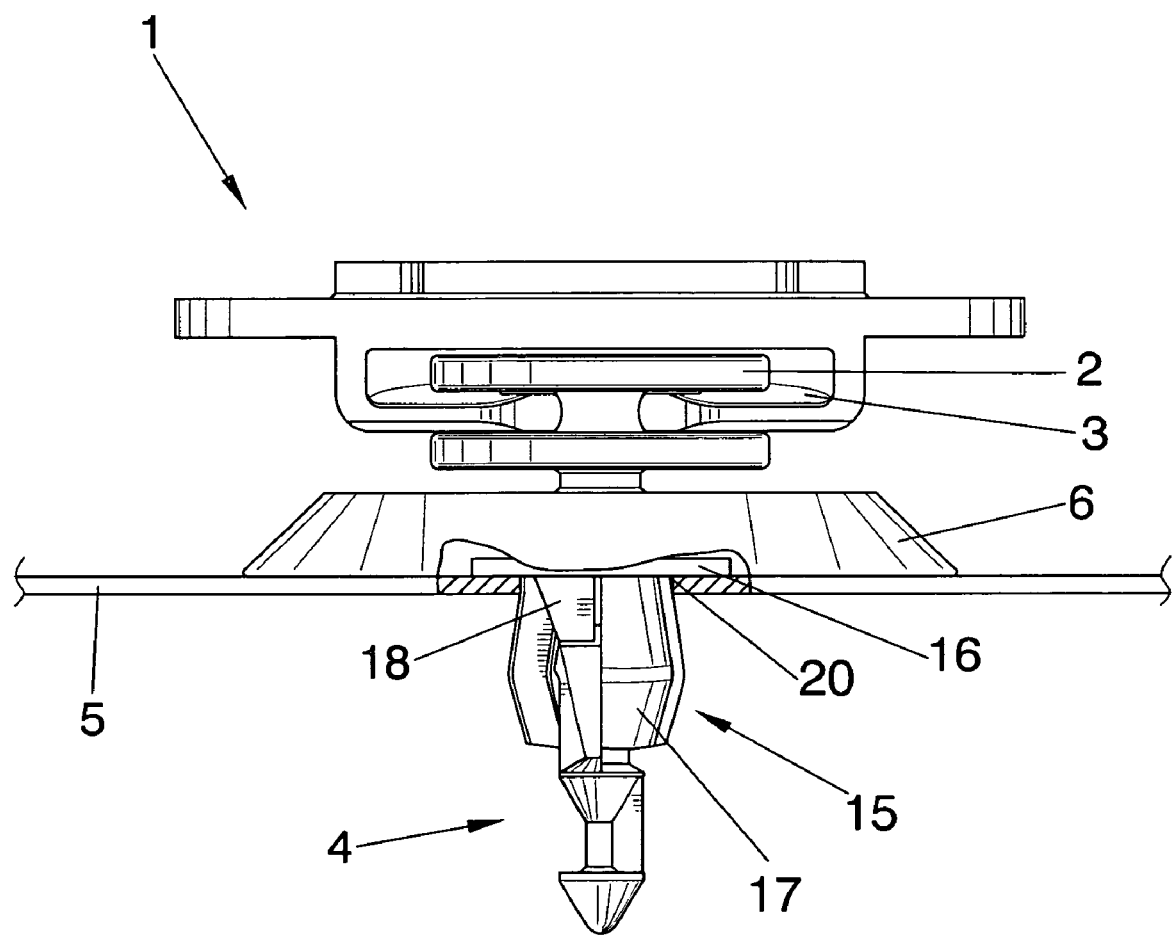
FIG. 4 is an elevation view of the attachment device with the retention bushing in its upper position with its elongated legs expanded outward to establish the retention position with respect to the support.

Based on this construction, the attachment device mainly stands out in that the lower elongated sector (4) is inserted in a retention bushing (15) that is coupled at a lower position, corresponding to the transport and supply position of the attachment device for the later insertion of the bushing (15) and the body (1) through the orifice (20), see FIG. 3, and is coupled at an upper retention position corresponding to the subsequent situation, see FIG. 4, where the retention of the bushing (15) is established with respect to the support (5).

The lower elongated segment (4) comprises an end conical segment (7) and at a higher level is provided with a lower segment (8), an intermediate segment (9) and an upper segment (10), the intermediate segment (9) and upper segment (10) having incuts limited by vertical side ribs (11).

The retention bushing (15) comprises an annular head (16) from where extend elongated legs (17) alternating with short legs (18), so that in the lower insertion position the elongated legs (17) are housed in the lower segment (8) of the body and the short legs (18) are housed in the intermediate segment (9), and in the upper retention position the elongated legs (17) are placed on the ribs (11), bending and expanding outward under the lower face of the support (5) to establish their retention, while the short legs (18) are housed in the upper segment (10).

The incuts in the intermediate segment (9) and upper segment (10) are limited by upper conical walls (9', 10') and by lower conical walls (9", 10") with an opposite inclination, the lower conical wall (10") of the upper segment (10) facilitating the sliding of the short legs (18) from the upper position to the lower position of the retention bushing (15), and the lower conical wall (9") of the intermediate segment (9) facilitates the extraction of the bushing (15) from the body (1).

The incut of the lower segment (8) is limited by an upper conical wall (12) that facilitates the sliding of the elongated legs (17) from the lower to the upper position of the bushing (15), a lower cylindrical core (13) and a vertical rib (14) that prevents the bushing (15) from turning in the lower position of the bushing (15), the elongated legs (17) being housed in this incut of the lower segment (8) in the lower position of the retention bushing (15), the elongated legs (17) show a slight inclination near their lower ends and are integrated on the upper face of the conical end segment (7) to prevent them from hitting the edge of the orifice (20) of the support (5) while they are introduced through it.

The invention claimed is:

1. Device for attaching a panel to a support comprising:
    an upper connecting arrangement adapted for connection to a structure, and a lower elongated sector, the lower elongated sector comprising:
    an end conical segment, a lower segment, an intermediate segment and an upper segment, the intermediate segment and upper segment each having incuts; and
    first side ribs extending between the intermediate segment and the upper segment and at least one second rib extending between the intermediate segment and the lower segment; and
    a retention bushing that is disposed on the elongated sector and movable therealong between a lower position and an upper position, the retention bushing being configured to engage the second rib in a manner which prevents relative rotation with respect to the elongated sector, and to comprise an annular head from which alternating elongated legs and short legs depend, the elongated and short legs being respectively configured, so that when the retention bush is in the lower position, free ends of the elongated legs engage a top of the end conical segment, and the short legs engage in an incut of the intermediate segment, and when the retention bushing is in the upper retention position, the elongated legs engage the ribs, so as to be outwardly deflected, while the short legs become engaged in an incut of the upper segment.

2. A device for attaching a panel to a support according to claim 1, wherein the incuts of the intermediate segment and the upper segment respectively comprise upper and lower conical walls with opposite inclinations, the lower conical wall of the upper segment facilitating the sliding of the short legs from the upper position to the lower position of the retention bushing, and the lower conical wall of the intermediate segment facilitating the extraction of the bushing from the body.

3. Device for attaching a panel to a support according to claim 1, wherein the lower segment has an incut comprising an upper conical wall that facilitates the sliding of the elongated legs from the lower to the upper position of the bushing, and a surface which extends essentially normally to the lower elongated sector and which is configured to abut the free ends of the elongated legs in a manner which the limit the downward movement of the retention bushing on the lower segment.

4. A device for attaching a panel to a support according to claim 1, wherein the elongated legs are curved near the free ends thereof so that a curvature of outer surfaces of the free ends is essentially contiguous with respect to a curvature of the conical end segment.

5. Device for attaching a panel to a support comprising:
    an upper connecting arrangement and a lower elongated sector, the lower elongated sector comprising:
    an end conical segment,
    a lower segment,
    an intermediate segment, and
    an upper segment, the intermediate segment and upper segment each having incuts; and
    first side ribs extending between the intermediate segment and the upper segment and
    at least one second rib extending between the intermediate segment and the lower segment; and
    retention bushing that is disposed on the elongated sector and movable therealong between a lower position and an upper position, the retention bushing being configured to:

engage the second rib in a manner which prevents relative rotation with respect to the elongated sector, and to comprise an annular head from which alternating elongated legs and short legs depend, the elongated and short legs being respectively configured, so that when the retention bush is in the lower position, free ends of the elongated legs engage a top of the end conical segment, and the short legs engage in an incut of the intermediate segment, and when the retention bushing is in the upper retention position, the elongated legs engage the first side ribs, so as to be outwardly deflected to a locking position, while the short legs become engaged in a incut of the upper segment.

* * * * *